June 20, 1967 J. W. T. WRIGHT 3,327,162

OPTICAL PROTECTION SYSTEMS

Filed July 5, 1963 2 Sheets-Sheet 1

# United States Patent Office 3,327,162
Patented June 20, 1967

3,327,162
OPTICAL PROJECTION SYSTEMS
John W. T. Wright, Leicester, England, assignor to Associated Electrical Industries Limited, London, England, a British company
Filed July 5, 1963, Ser. No. 293,072
Claims priority, application Great Britain, July 5, 1962, 25,860/62
4 Claims. (Cl. 315—50)

This invention relates to an optical system for projecting both moving images from cinematographic film and single frames of the film. The invention is also concerned with electric incandescent lamps for use in such a system.

It is desirable to incorporate in cinematographic projectors means for enabling the still projection of a selected frame of a film in addition to the normal operation of the projector. In most cinematographic projectors care has to be taken to prevent the film from being overheated as it passes through the gate, since a considerable proportion of the heat energy dissipated by the projection lamp is brought to a focus with the light beam at the gate. Over-heating of the film is particularly prevalent in projectors where means are provided for stopping the movement of the film through the projector with a selected frame in the gate to enable a still image to be projected, and in these projectors attempts have been made to overcome this difficulty by either reducing the supply voltage to the projector lamp or by interposing a heat filter between the lamp and the gate, or both, when a still image is projected.

An optical system for projecting both moving and still images from cinematographic film on to a screen includes, in accordance with the present invention, an electric incandescent lamp having two filaments of differing power rating and control means by which at least the filament having the higher power rating is energised from a source of supply when the projection of moving images is required and by which only the filament having the lower power rating is energised for the projection of a still image.

Preferably both filaments are energised when projecting moving images and a resistor is connected electrically in series with the filament having the lower power rating so that it operates at about the same colour temperature as the filament having the higher power rating. For still projection the filament having the higher power rating is switched off and the resistance in series with the other filament is short-circuited so that all the light emitted by the lamp is obtained from the filament having the lower power rating, operating at a very high efficiency.

In order that the invention may be more readily understood, it will now be described by way of example with reference to the accompanying drawings, in which.

Figure 1:
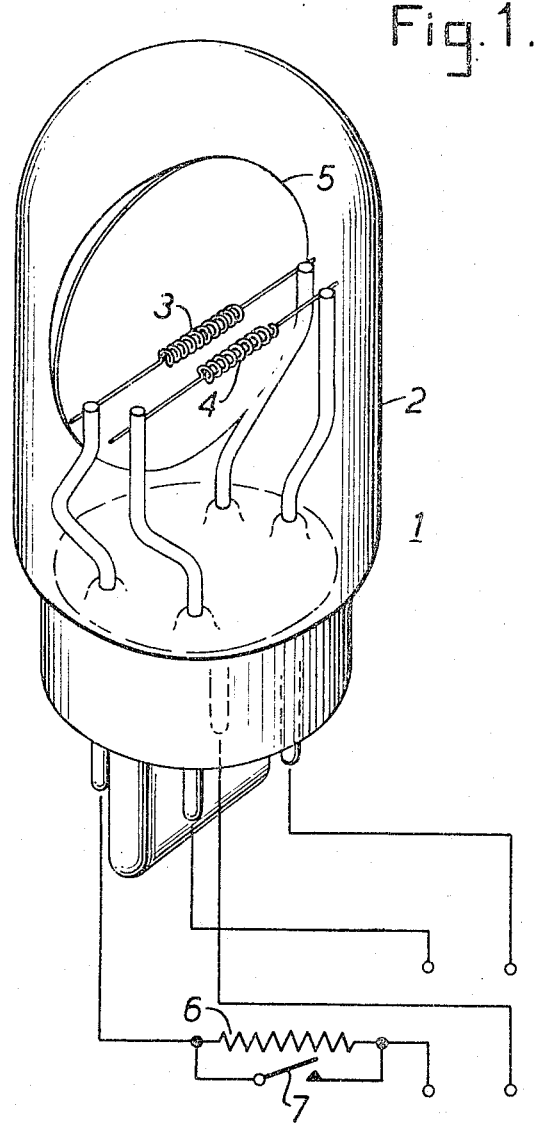
FIG. 1 shows in diagrammatic form an optical projection system.

An electric incandescent lamp suitable for use in an optical projection system is indicated by reference numeral 1 in FIG. 1. The lamp comprises a sealed envelope 2 of light transmitting vitreous material containing two separate filaments 3 and 4, each filament being supported within the envelope by a pair of conducting members which extend through glass-to-metal seals to the exterior of the envelope. The filaments are of differing power ratings and the filament 4, when energised from a source of potential, provides all, or a considerable portion of, the illumination provided by the lamp for projecting moving images. The filament 3 which has a lower power rating is alone employed for projecting still images from cinematographic film, and the two filaments may be arranged in parallel relation to each other, as shown in FIG. 1, but this is not essential, and they may be inclined at any suitable angle to each other. A reflector for directing the light emitted by the filaments onto a convergent beam is employed in the optical system, and the reflector may be in the form of an ellipsoidal mirror 5 mounted within the envelope.

One method of operation of the optical projection system shown in FIG. 1 is to use both of the filaments of the lamp for the projection of moving cinematographic images, but with a resistor 6 forming part of control means connected electrically in series with the filament 3 to reduce the voltage thereacross so that it operates at about the same colour temperature as the filament 4. For still projection the filament 4 is not energised and the resistance 6 in series with the filament 3 is short-circuited by the switch 7 so that the full supply voltage is supplied to the filament. This filament is thus overrun and operated at a high efficiency while a still image is projected.

When projecting a selected frame from a film the frame may be positioned in the gate for several minutes as compared with a fraction of a second when the projector is operated normally. Consequently, to prevent the frame from being damaged due to the heat falling upon it when it is stationary in the gate, the heat output from the filament 3 has to be considerably less than the total heat output when both filaments are energised for projection of moving images. By overrunning filament 3 as described, and by stopping the rotation of the flicker shutter, an illumination of the screen for still pictures may be obtained approaching that obtained from both filaments and of good colour rendering as with the film moving, together with a much reduced heat output, owing to the high efficiency at which filament 3 operates under these conditions. The two filaments 3 and 4 are arranged close to one another and to the reflecting system of the projector. The focussing of the lens system is unaffected and does not require re-adjustment when changing from moving to still images and vice-versa. As an example of this arrangement, for use on a 10–12 volt supply the filament 4 may be of the order of 100 watts, while the filament 3 operates at 50 watts, and the resistor 6 is then of the order of 1–2 ohms.

Figure 2:
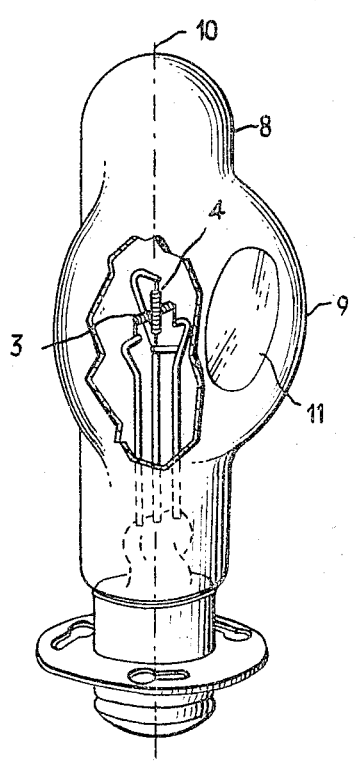
FIG. 2 is a perspective of an incandescent lamp employed in the optical projection system shown in FIG. 1.
Figure 3:
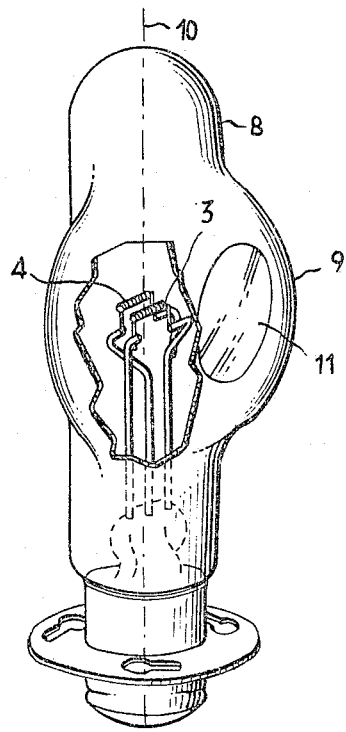
FIG. 3 is a perspective of a further incandescent lamp.

FIGS. 2 and 3 show electric incandescent lamps which could be used to replace the lamp 1 of FIG. 1. The lamps are of the screw base type and the reflector of the optical system forms part of the envelope of the lamps. The envelopes have a generally tubular portion 8 and are provided with a portion 9 of hemispherical form which is internally silvered to form a reflector on one side of the longitudinal axis 10 of the tubular portion, and a portion of ellipsoidal form similarly silvered (not shown) is located on the other side of the axis, the centre of the hemispherical portion being coincident with one of the foci of the ellipsoidal portion. In the arrangement shown in FIG. 2, the two filaments 3 and 4 are positioned in cruciform arrangement at the centre of the hemispherical portion and the common focus of the ellipsoidal portion, and the light emanating from the filaments when they are energised passes through a transparent portion 11 formed in the reflector 9. In the lamp shown in FIG. 3, the two filaments 3 and 4 are positioned in parallel arrangement close to, and one on each side of, the centre of the hemispherical portion and the common focus of the ellipsoidal portion.

Figure 4:
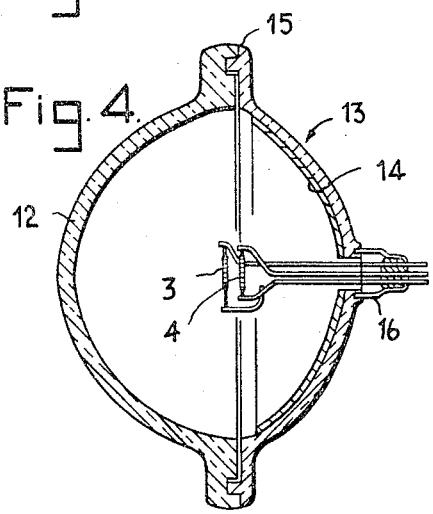
FIG. 4 is a perspective of an incandescent lamp of the sealed beam type.

The lamp may be of the sealed beam type, and a suitable arrangement is shown in FIG. 4. The lamp comprises two preformed dish-shaped components 12 and 13 of light transmitting vitreous material which are sealed together along their flanged periphery 14. The component 13 is of generally ellipsoidal form and the internal surface thereof is silvered and polished to form a reflector 15. The two filaments 3 and 4 are positioned close to the focus of the reflector 15 and are each mounted on support members which pass through the component 13 to the exterior of the lamp by means of a glass-to-metal seal 16.

Figure 5:
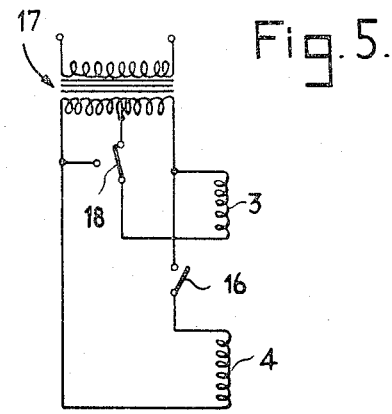
FIG. 5 is a circuit diagram of control means employed in one embodiment of the invention.

FIG. 5 illustrates an alternative control means to that shown in FIG. 1. When the filaments are to be energised from an alternating supply, the filament 4 of the lamp, which has the higher power rating, is connected through switching means 17 across the secondary winding of a transformer 18, the primary winding of which is connected to the source of supply. The secondary winding is tapped, and the other filament 3 is connected through switching means 19, either across all, or a part of the secondary winding. For the projection of moving images the switching means 17 is closed to energise the filament 4, and the filament 3 is connected between one end of and the tapping point on the secondary winding of the transformer. For the projection of a still image, however, the switching means 17 is opened so that the filament 4 is no longer energised, and the filament 3 is connected across the complete secondary winding, and in this way the filament 3 is overrun and operates with a high efficiency.

What I claim is:

1. The combination of an electric incandescent lamp comprising a sealed envelope at least in part of light transmitting material, first and second filaments in said envelope, said second filament having a lower power rating and a lower voltage rating than said first filament, terminals on the exterior of the envelope, and lead-in conductors between the filaments and respective external terminals, first electrical connections with a source of electrical energy of the same voltage as the rating of said first filament connected to the external terminals of said first filament, further electrical connections between said source and the terminals of said second filament, said further connections including voltage reducing means for reducing the voltage applied to said second filament to a value at which the color temperature of light emitted by the filament is substantially the same as that of light emitted by the first filament and switching means for rendering said voltage reducing means inoperative.

2. The combination as claimed in claim 1, wherein a reflector is mounted in the envelope of the lamp, said reflector serving to direct most of the light emitted by the filaments into a convergent beam.

3. The combination as claimed in claim 2, wherein the reflector forms part of the envelope of the lamp.

4. The combination as claimed in claim 1, wherein the voltage reducing means includes a tapped secondary winding of a transformer, the primary winding of which is connectible to said source.

References Cited

UNITED STATES PATENTS

| | | | |
|---|---|---|---|
| 480,954 | 8/1892 | Melick | 315—66 |
| 669,362 | 3/1901 | Emmott | 315—71 X |
| 1,807,140 | 5/1931 | Von Wedel | 240—41.25 |
| 2,242,383 | 5/1941 | Beekley | 315—69 |
| 2,843,801 | 7/1958 | Krefft | 313—346 X |
| 3,138,737 | 6/1964 | French | 315—50 |

FOREIGN PATENTS

| | | |
|---|---|---|
| 746,201 | 6/1944 | Germany. |
| 677,822 | 8/1952 | Great Britain. |

JOHN W. HUCKERT, *Primary Examiner.*